United States Patent
Sato

(10) Patent No.: US 8,068,287 B2
(45) Date of Patent: Nov. 29, 2011

(54) LENS BARREL

(75) Inventor: Tatsuya Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/491,854

(22) Filed: Jun. 25, 2009

(65) Prior Publication Data

US 2010/0020413 A1 Jan. 28, 2010

(30) Foreign Application Priority Data

Jun. 27, 2008 (JP) ................................. 2008-169246

(51) Int. Cl.
*G02B 15/14* (2006.01)
*G03B 17/00* (2006.01)
(52) U.S. Cl. ........................... 359/700; 359/822; 396/72
(58) Field of Classification Search .......... 359/700–704, 359/822–826; 396/72, 75, 348–350
See application file for complete search history.

(56) References Cited

U.S. PATENT DOCUMENTS 6,049,432 A * 4/2000 Machida et al. .............. 359/700
6,487,025 B2 * 11/2002 Koiwai et al. ................. 359/699

FOREIGN PATENT DOCUMENTS

JP 2002-267917 A 9/2002

* cited by examiner

*Primary Examiner* — Darryl J Collins

(57) ABSTRACT

A lens barrel includes a lens holding frame configured to hold a lens and being provided with a cam follower, a guide tube engaging with the lens holding frame and being configured to rectilinearly guide the lens holding frame in an optical axis direction, and a cam tube engaging with the cam follower and being provided with a cam slot which engages with the cam follower, the cam tube being configured to rotate about the optical axis thereby to move the lens holding member in the optical axis direction, wherein the cam slot has a locus including a flat portion orthogonal to the optical axis and a lift portion not orthogonal to the optical axis, wherein the flat portion has a surface perpendicular to the optical axis, and wherein the cam follower has a surface parallel to the perpendicular surface.

11 Claims, 12 Drawing Sheets

LENS BARREL

BACKGROUND OF THE INVENTION

1. Field of the Invention

This invention relates to a lens barrel for driving a lens holding member which holds a lens, by use of a cam structure. More particularly, the invention concerns a lens barrel of what can be called a tube collapsing type in which, for better portability in the non-photographic state, a lens holding member moves to protrude out of and sink into a barrel body portion along the optical axis direction.

2. Description of the Related Art

An example of such collapsing type lens barrel having a zoom function is disclosed in Japanese Laid-Open Patent Application No. 2002-267917. This lens barrel is provided with a cam follower which protrudes from the outer peripheral surface of a lens holding frame for holding a movable lens, a cam slot which is formed on the inner peripheral surface of a cam tube and with which the cam follower engages, and a guide tube for interrupting the rotation of the lens holding frame to guide the lens holding frame rectilinearly.

Furthermore, the cam tube is rotationally moved about the optical axis by a motor. By moving the lens holding frame forwardly and backwardly along the optical axis direction by means of a cam slot formed at the inner circumference of the cam tube and a straight-motion guide slot provided at the guide tube, the tube collapsing operation and the zooming operation are carried out.

Furthermore, in order to prevent the cam follower from disengaging from the cam slot if an external force such as impact is applied when the lens holding frame is being protruded, the shape of the cam slot is defined by a perpendicular surface being perpendicular to the inner circumferential surface of the cam tube as well as a slant surface.

However, if the external force is large, even with the aforementioned lens barrel there is a possibility that the cam follower disengages from the cam slot. Generally, the cam tube is a molding being molded by injection molding, while the cam follower is a metal component of circular shape. Therefore, if the external force is large, the cam follower may shave the cam slot and disengage from it.

Thus, although the proof strength (proof stress) to the external force may be better in the structure in which the cam slot has a perpendicular surface as in the aforementioned lens barrel, in comparison with the structure in which the cam slot is formed only by slant surfaces as of a trapezoid shape, further improvement of the proof strength is desirable.

SUMMARY OF THE INVENTION

The present invention provides a lens barrel by which at least one of the problems described above can be removed or reduced and by which the proof strength of the cam slot to the external force such as impact is improved furthermore without degrading the function thereof.

In accordance with an aspect of the present invention, there is provided a lens barrel which includes a lens holding frame configured to hold a lens and being provided with a cam follower; a guide tube engaging with said lens holding frame and being configured to rectilinearly guide said lens holding frame in an optical axis direction; and a cam tube engaging with said cam follower and being provided with a cam slot which engages with said cam follower, said cam tube being configured to rotate about the optical axis thereby to move said lens holding member in the optical axis direction, wherein said cam slot has a locus including a flat portion orthogonal to the optical axis and a lift portion not orthogonal to the optical axis, wherein the flat portion has a surface perpendicular to the optical axis, and wherein said cam follower has a surface parallel to the perpendicular surface.

According to other aspects of the present invention, the lens holding frame may hold a lens which is closest to a photogenic subject side. Also, the lens may be a zoom lens. Furthermore, the cam slot of the lift portion may be formed with a step configured to avoid interfere with the parallel surface. Moreover, the cam slot may be formed at an inner wall of said cam tube, and the lens holding frame may be fitted into said cam tube.

In accordance with a further aspect of the present invention, there is provided a lens barrel, including a first tube provided with a cam slot; and a second tube engaging with said first tube and being provided with a cam follower which engages with said cam groove, said first tube being configured to relatively rotate relative to said second tube about an optical axis, whereby said first tube is relatively moved relative to said second tube in the optical axis direction, wherein said cam slot has a locus including a flat portion orthogonal to the optical axis and a lift portion not orthogonal to the optical axis, wherein the flat portion has a surface perpendicular to the optical axis, and wherein said cam follower has a surface parallel to the perpendicular surface.

These and other aspects, features and advantages of the present invention will become more apparent upon a consideration of the following description of the embodiments of the present invention taken in conjunction with the accompanying drawings.

DESCRIPTION OF THE EMBODIMENTS

Various embodiments of the present invention will now be described with reference to the attached drawings.

Figure 1:
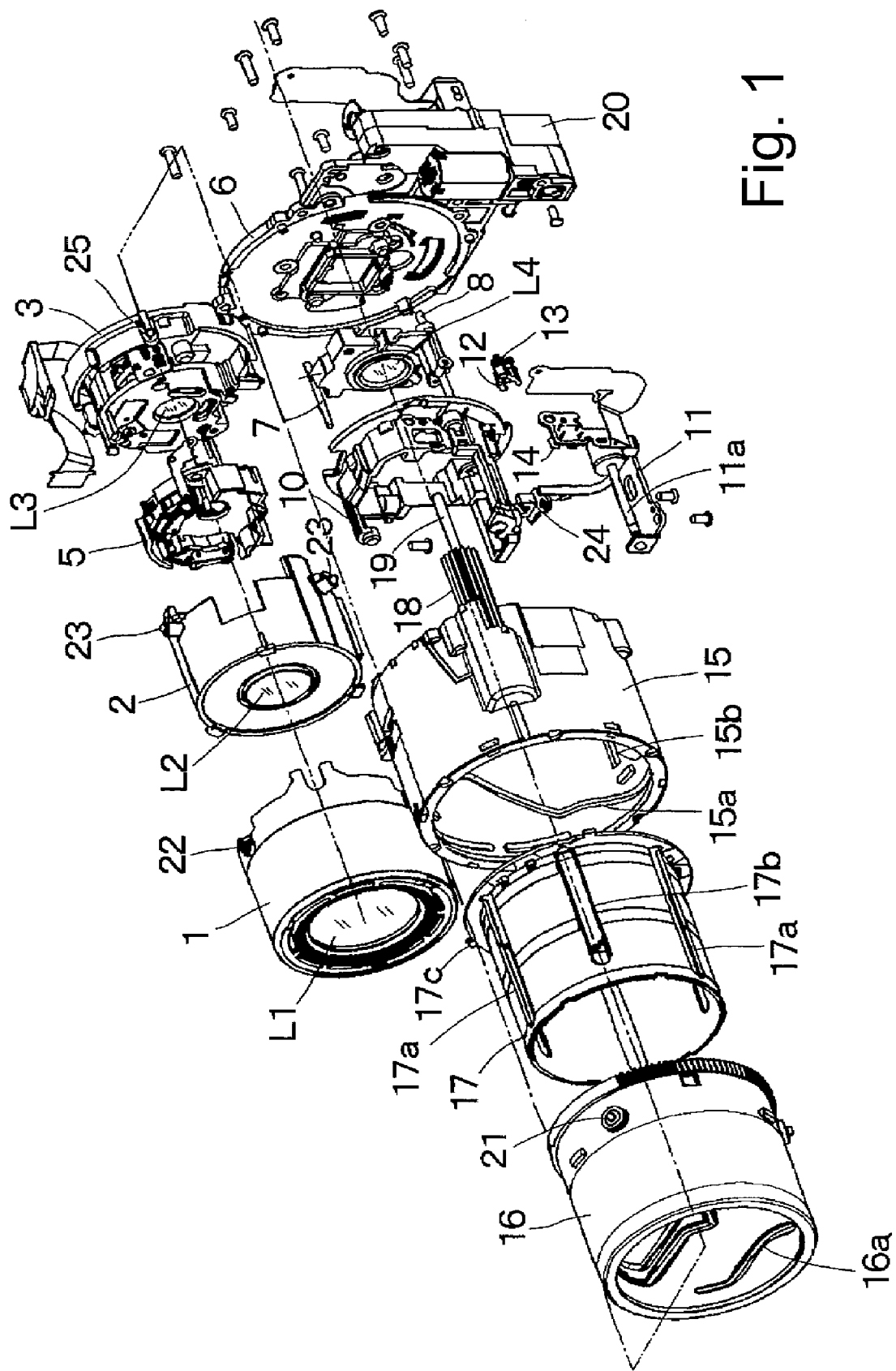
FIG. 1 is an exploded perspective view of a lens barrel according to an embodiment of the present invention.
Figure 2:
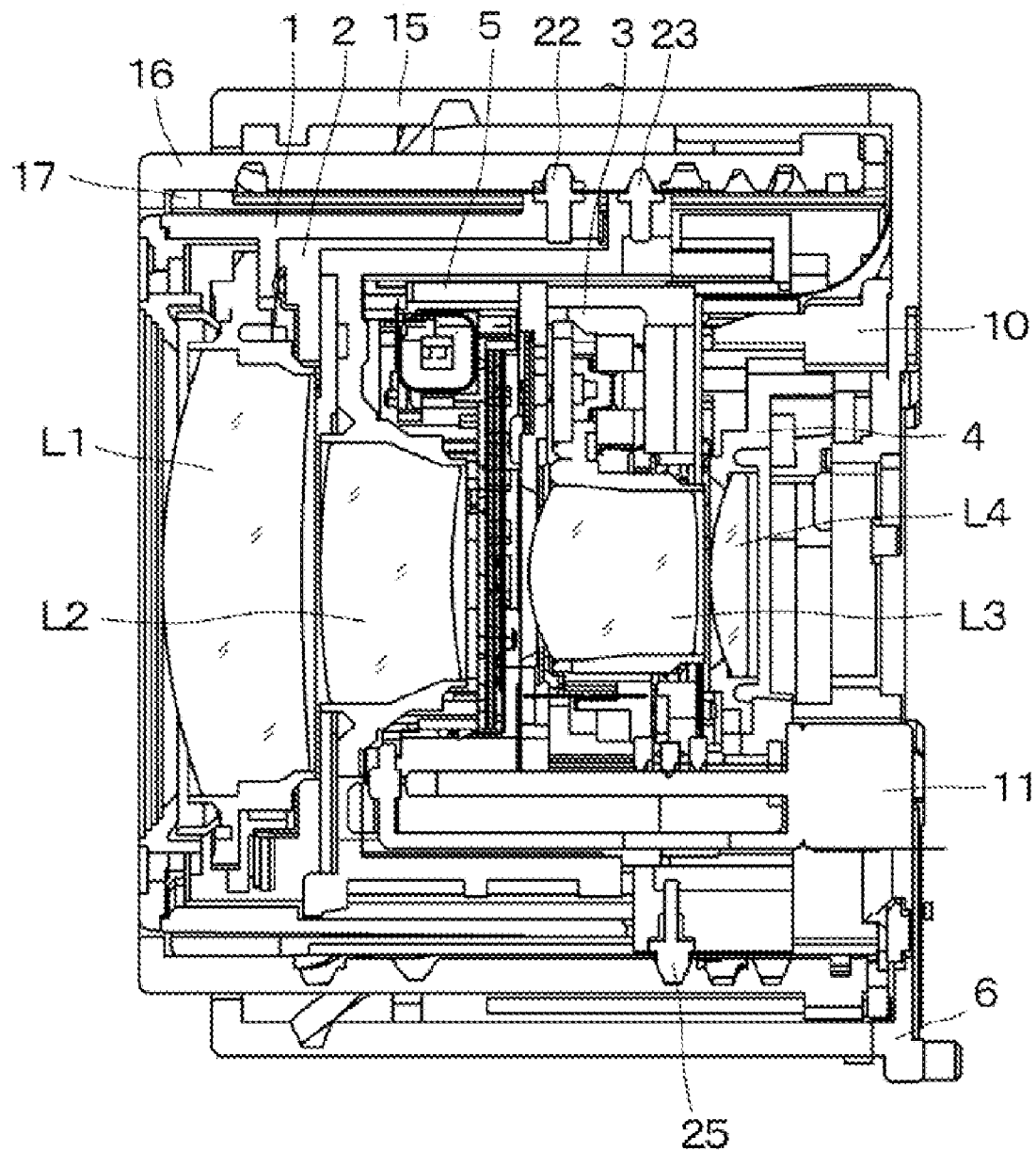
FIG. 2 is a section view of the lens barrel in the tube-collapsed state.
Figure 3:
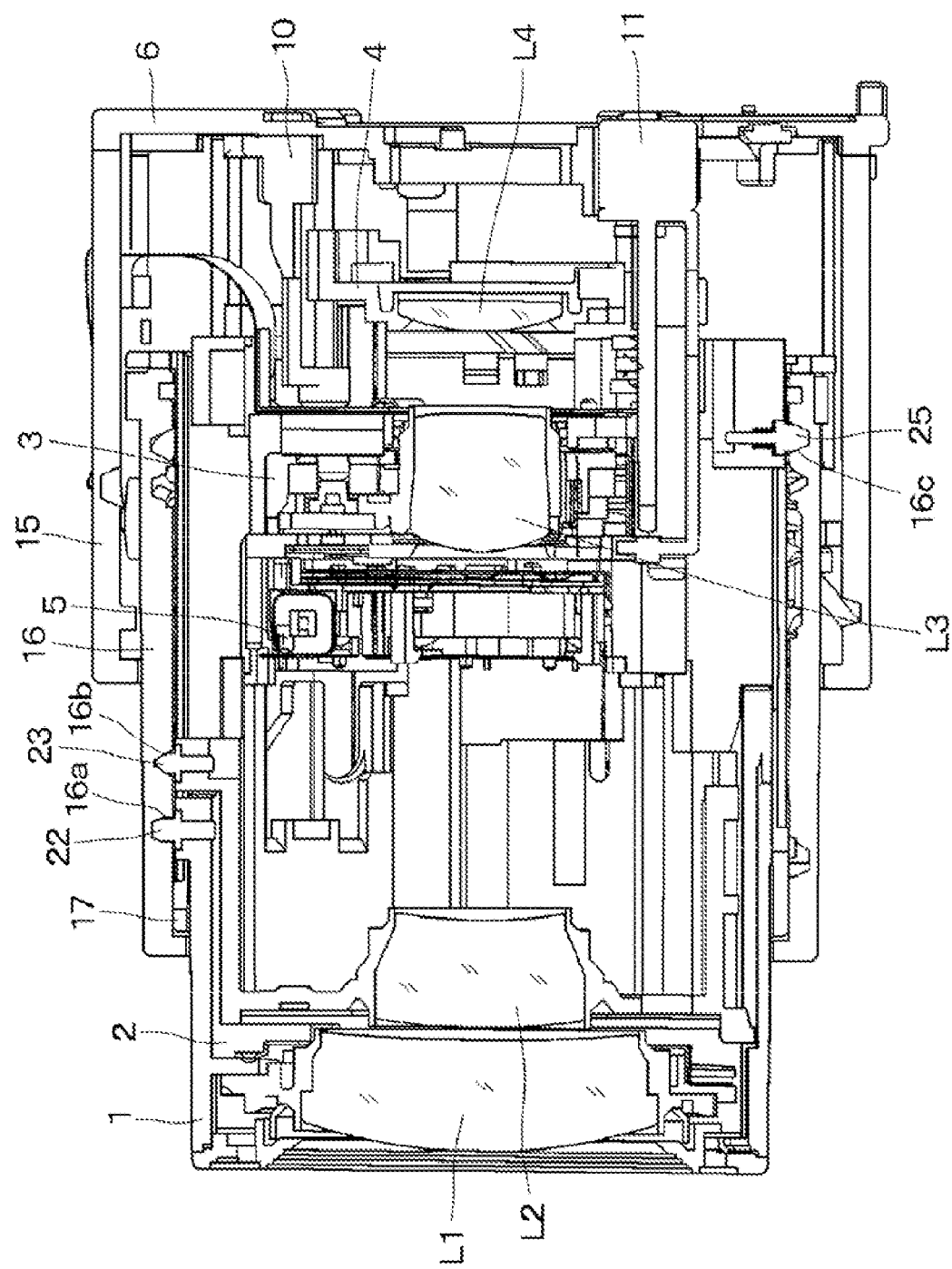
FIG. 3 is a section view of the lens barrel in the wide-angle state.
Figure 4:
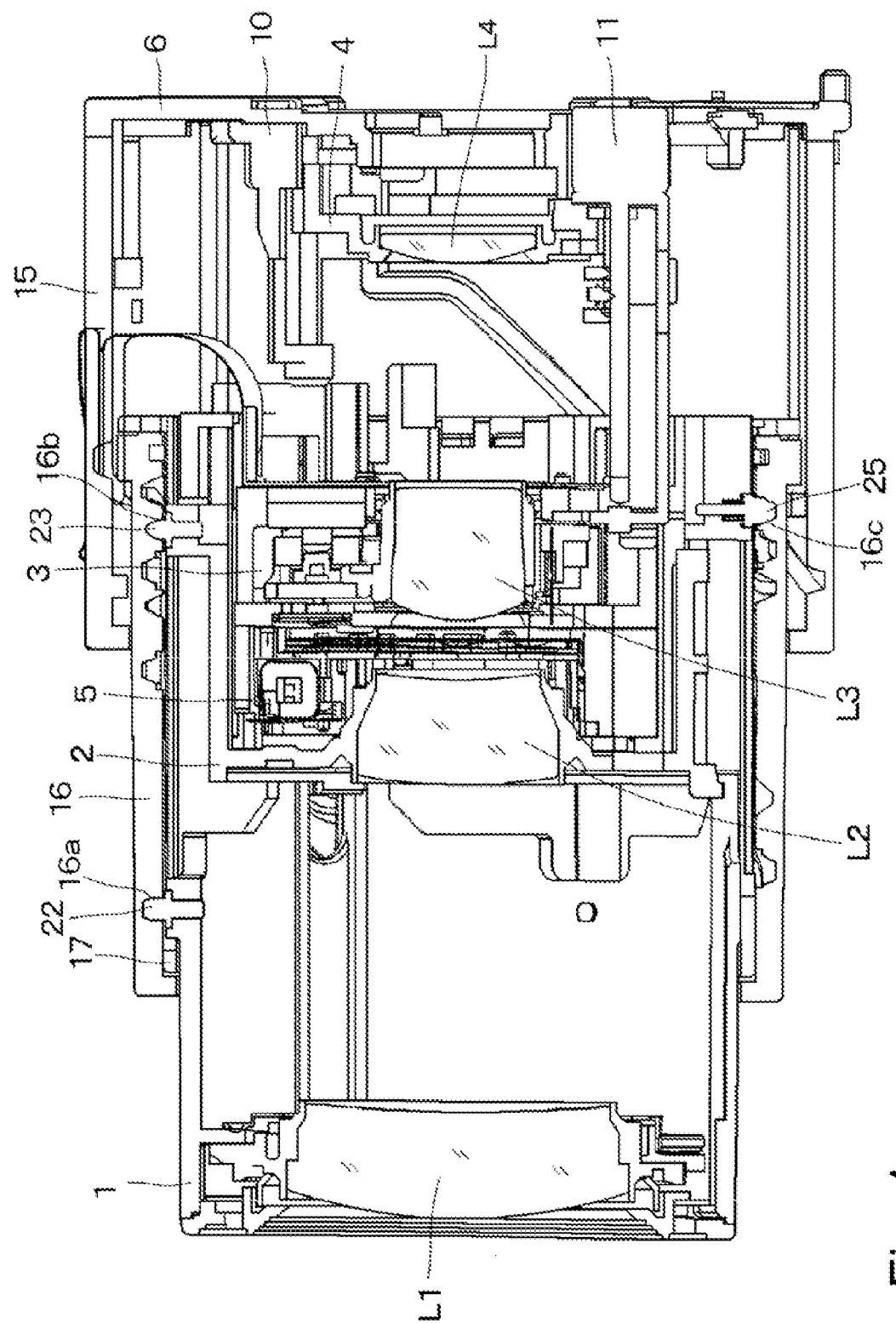
FIG. 4 is a section view of the lens barrel in the telephoto state.

FIG. 1 is an exploded perspective view of a lens barrel according to an embodiment of the present invention. FIG. 2 is a section view of the lens barrel in the tube-collapsed state. FIG. 3 is a section view of the lens barrel in the wide-angle state. FIG. 4 is a section view of the lens barrel in the telephoto state.

The lens barrel of the present embodiment comprises a variable-power optical system of four-group structure and it is applied to what can be called a two-step tube collapsing type lens barrel in which, in the non-photographic state, the spacing of individual lens groups is reduced as compared with that in the standard state so as drastically shorten the lens overall length.

The four lens groups include, along the optical axis and in an order from the photogenic subject side, a first lens group L1, a second lens group L2, a third lens group L3 which moves within a plane perpendicular to the optical axis to perform blurring correction, and a fourth lens group L4 which moves in the optical axis direction to perform the focusing operation.

A first group unit 1 includes a first lens holding frame which holds the first lens group L1. A second group unit 2 includes a second lens holding frame which holds the second lens group L2. A third group unit 3 includes a third lens holding frame which enables shift movement of the third lens group L3 in a plane perpendicular to the optical axis. A fourth group unit 4 includes a fourth lens holding frame which holds the fourth lens group L4.

A stop unit 5 for adjusting the light quantity is disposed between the second group unit 2 and the third group unit 3. Also, behind the fourth group unit 4, there is an image pickup device comprising a CCD or the like, and it is held by a CCD holder 6.

The fourth group unit 4 is movably supported through the guiding by guide bars 7 and 8, for movement in the optical axis direction. The backward end portions of the guide bars 7 and 8 are positioned and fixed on the CCD holder 6, while the forward end portions of the guide bars 7 and 8 are positioned and fixed on a rear barrel 10. The rear barrel 10 is fixed to the CCD holder 6 and a focusing motor (driving source) 11 by screws.

The fourth group unit 4 is moved forwardly and backwardly along the optical axis direction by the driving of the focusing motor 11. A rack 12 is in thread engagement with a lead screw 11a which rotates integrally with a rotor of the focusing motor 11. Thus, the revolutional motion of the lead screw 11a is converted into a rectilinear driving motion of the fourth group unit 4. A rack spring 13 functions to provide a bias for reducing back lash between the fourth group unit 4 and the rack 12.

A photointerrupter 14 detects the absolute position of the fourth group unit 4. As a light blocking wall of the fourth group unit 4 moves across the photointerrupter 14, the light interruption and non-interruption of the photointerrupter 14 switches, by which the absolute position can be detected.

A fixed tube 15 is fixed to the CCD holder 6 by screws. The fixed tube 15 is provided with a cam slot 15a formed inside the fixed tube to forwardly and backwardly move the cam tube (cam member) 16 along the optical axis direction and, additionally, a straight-motion guide slot 15b which engages with a key 17c provided at an inner guide tube 17 to perform decentration positioning of the guide tube 17 with respect to the optical axis and the straight-motion guide of the same.

With regard to the guide tube 17 and the cam tube 16 outside the tube 17, their positions in the optical axis direction are integrally regulated by means of a bayonet structure. These are guided rectilinearly by means of the key 17c and the guide slot 15b shown in the development view of the fixed tube 15 of FIG. 5, such that these tubes move forwardly and backwardly in the optical axis direction while making rotational motion around the contour of the guide tube 17.

Figure 6:
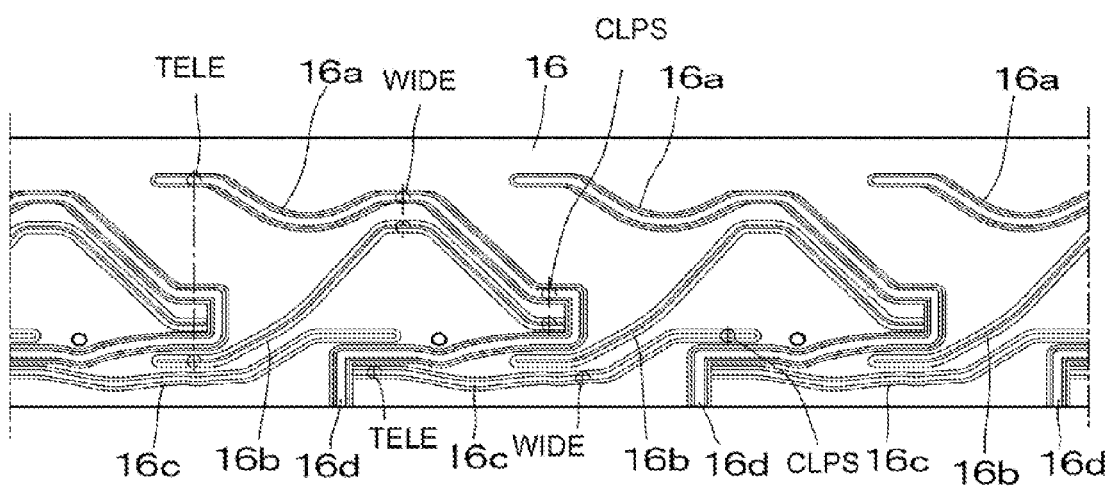
FIG. 6 is a cam-development view of a main portion of a cam tube.

The cam tube 16 is provided with cam slots 16a, 16b and 16c formed on its inner circumferential surface, such as shown in the development view of FIG. 6, to enable forward and backward motion of the first group unit, second group unit 2 and third group unit 3 along the optical axis.

There is a rod gear 18 which is in thread engagement with a gear member provided at the cam tube 16 and which is configured to be continuously kept in thread engagement within the range of the rotational drive of the cam tube 16. This gear 18 needs a predetermined length, and it rotates at a stationary position around a rod-gear shaft 19 which is provided between the fixed tube 15 and the CCD holder 6.

A zoom motor unit 20 is fixed to the CCD holder 6 by screws. The zoom motor unit 20 has an output gear which is in thread engagement with the rod gear 18, such that the driving power of the zoom motor unit 20 is transmitted to the cam tube 16 through the rod gear 18.

Figure 7:
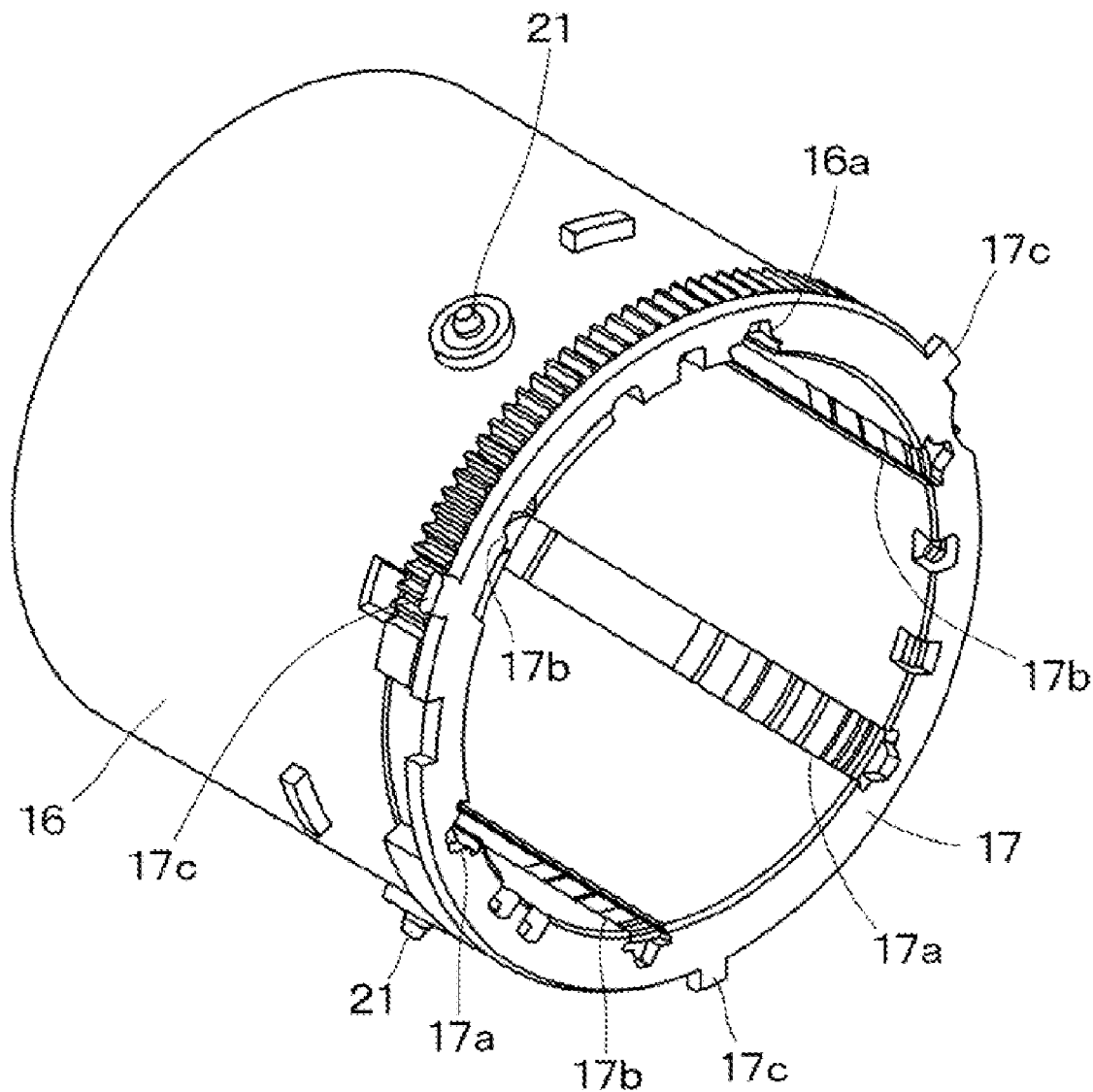
FIG. 7 is a perspective view of the cam tube and a guide tube.

In FIG. 7, the cam tube 16 is provided with three cam follower pins 21 which are formed at equiangular 120-degree positions. These cam follower pins 21 engage with cam slots 15a of the fixed tube 15 shown in FIG. 5, such that the cam tube can move to protrude in the sequence of collapsed position→wide-angle position→telephoto position. Here, the cam slots 15a include flat portions (parallel flat sections), namely, horizontally extending portions as viewed in FIG. 5, which become parallel to a direction perpendicular to the optical axis at the collapsed position, wide-angle position and telephoto position, respectively.

Furthermore, the first group unit 1 is provided with three cam follower pins 22 which are disposed at equiangular 120-degree positions. These cam follower pins 22 of the first group unit 1 engage with cam slots 16a shown in FIG. 6, such that the first group unit 1 can move to protrude in the sequence of collapsed position→wide-angle position→telephoto position.

However, the cam tube 16 itself moves, too, as described hereinbefore. It moves to the optical position as determined by the synthetic cam lift amount of two cam slots 15a and 16a. In this embodiment, since the cam tube 16 moves to protrude from the collapsed position to the telephoto position, the first group unit 1 is configured to protrude by an amount corresponding to the sum. Here, the cam slot 16a has flat sections at the tube collapsed position, wide-angle position and telephoto position, respectively, which are parallel to a direction orthogonal to the optical axis.

On the other hand, the second group unit 2 is provided with three cam follower pins 23 disposed at equiangular 120-degree positions. These cam follower pins 23 of the second group unit 2 engage with cam slots 16b shown in FIG. 6, such that the second group unit protrudes in the motion from the collapsed position to the wide-angle position, but it is pulled back in the motion from the wide-angle position to the telephoto position. The cam tube 16 itself moves, too. The second group unit 2 once protrudes to the wide-angle position, and at the telephoto position it moves to an optical position which is pulled back than that of the wide-angle position. The movement of this second group unit 2 is detected by the photointerrupter 24.

The third group unit 3 is provided with three cam follower pins 25 which are disposed at equiangular 120-degree positions. These cam follower pins 25 engage with cam slots 16c shown in FIG. 6, such that the third group unit is pulled back in the motion from the collapsed position to the wide-angle position. In the motion from the wide-angle position to the telephoto position, it is once pulled back around an intermediated portion thereof and, at the telephoto position, it is protruded as compared with that at the wide-angle position. The cam tube 16 itself moves, too, and the third group unit 3 moves to an optical position being protruded by the motion from the collapsed position to the telephoto position.

As described above, the cam tube 16 makes forward and backward motion along the optical axis direction as well as rotational motion about the optical axis, such that the first group unit 1, the second group unit 2 and the third group unit 3 are guided by straight-motion guide slots 17a and 17b formed on the guide tube 17. As a result of this, the first group unit 1, the second group unit 2 and the third group unit 3 are relatively moved forwardly and backwardly along the optical axis to carry out the magnification changing operation and, on the other hand, the whole lens barrel is collapsed.

Furthermore, although in this embodiment the cam tube 16 has such a cam locus as mentioned above, a different cam locus which optically accomplishes a required movement amount of each lens group and a lens group interspace may of course be used.

Figure 5:
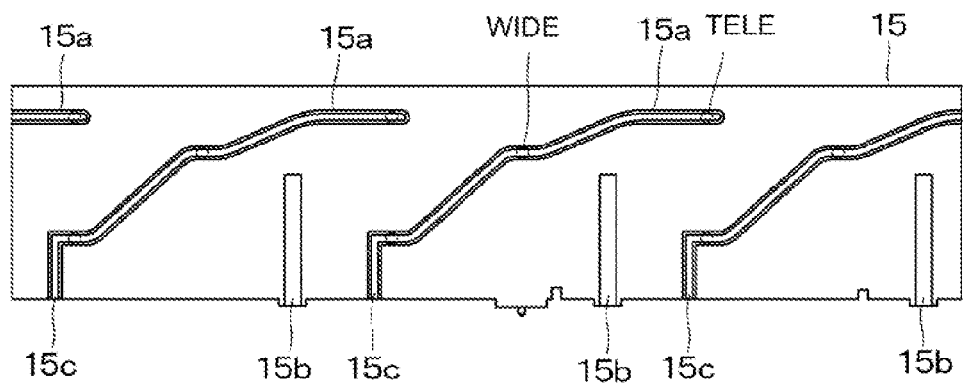
FIG. 5 is a cam-development view of a main portion of a fixed tube.

Cam slot entrances 15c of the fixed tube 15 shown in FIG. 5 have a function for introducing the cam follower pins 21 of the cam tube 16 into cam slots 15a. Furthermore, cam slot entrances 16d of the cam tube 16 shown in FIG. 6 have a function for introducing the cam follower pins 22 of the first group unit 1, cam follower pins 23 of the second group unit 2, cam follower pins 25 of the third group unit 3 into the cam slots 16a, 16b and 16c, respectively.

Figure 8:
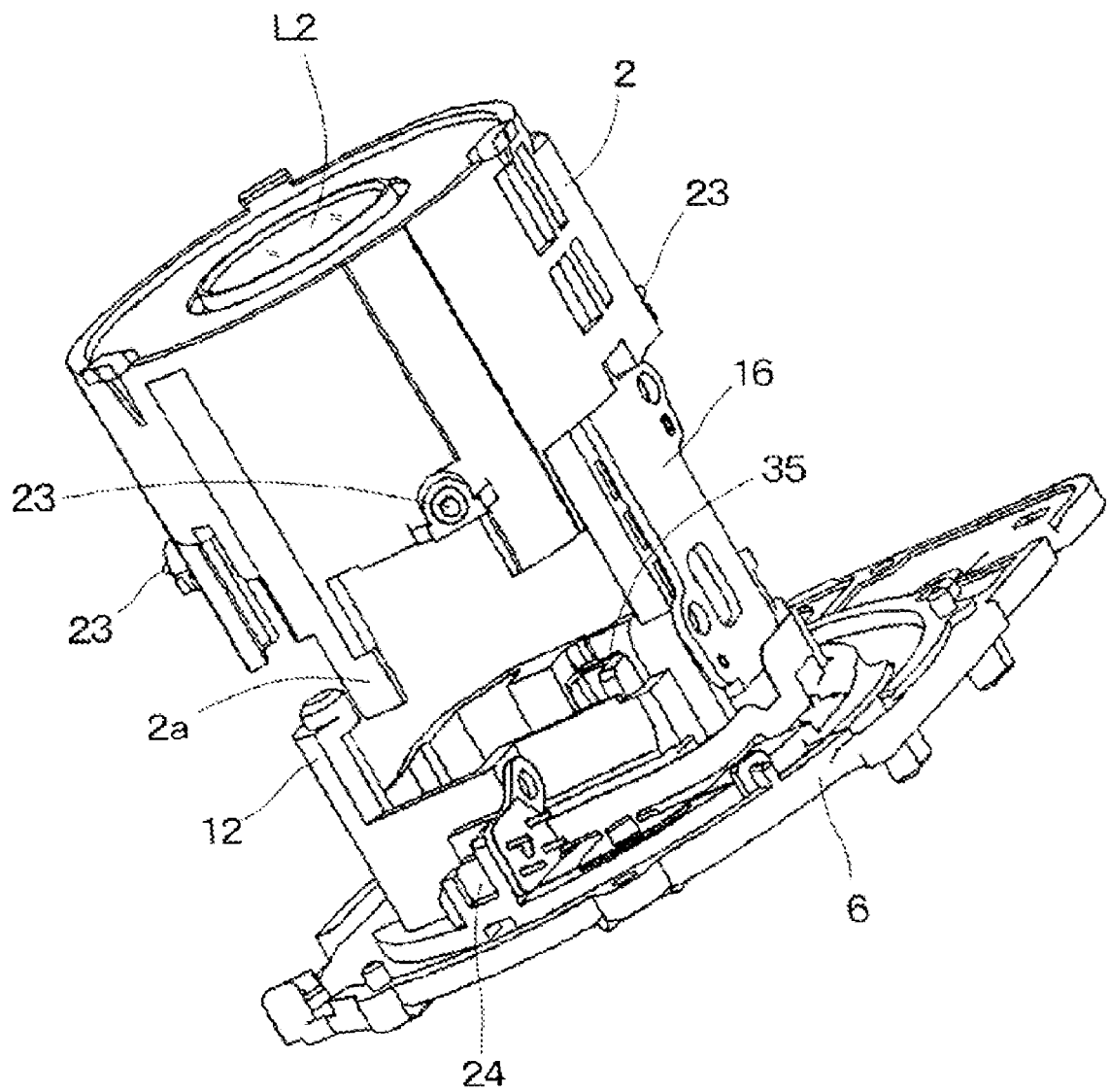
FIG. 8 is a perspective view of a second group unit and a photointerrupter.

The zoom operation in the present embodiment described above is carried out by applying a driving power of the zoom motor unit 20 through the rod gear 18 to rotate the cam tube 16 and also to move the cam tube 16 itself, the first group unit 1, the second group unit 2 and the third group unit 3 in the optical axis direction. Here, the absolute position in the zoom operation is detected based on that: when a light blocking wall 2a provided in the second group unit 2 and shown in FIG. 8 passes through the photointerrupter 24, the electric output thereof changes in response to the switching between light interruption and non-interruption.

In this embodiment, the detection by the photointerrupter 24 is carried out at a predetermined position between the tube collapsed position and the wide-angle position. In the photographic operation, taking the switching of this photointerrupter 24 as an absolute position, pulses are detected and counted by a pulse generating mechanism which may be built in a zoom motor unit 20. Thus, this embodiment has a control function by which the zoom lens can be stopped at an arbitrary position in the motion from the wide-angle position to the telephoto position.

The pulse generating mechanism may be one using a combination of what can be called a pulse board and a photointerrupter or a photo-reflector, or alternatively one using a stepping motor.

Figure 9:
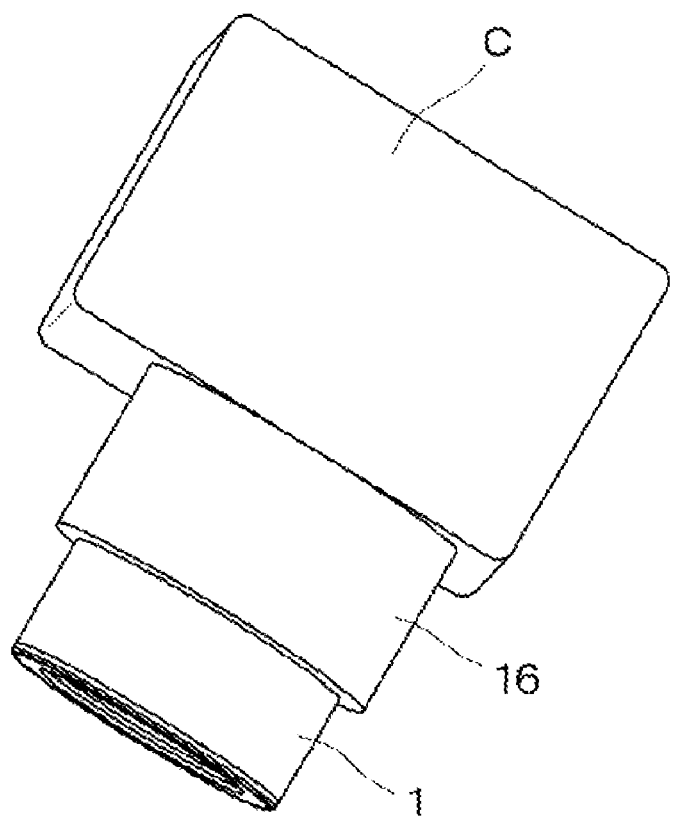
FIG. 9 is a diagram for explaining the fall of a camera.
Figure 9:
Figure 9:
Figure 10:
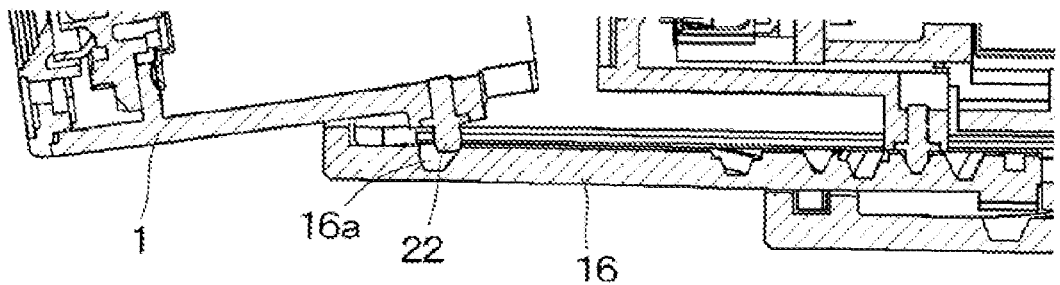
FIG. 10 is a schematic diagram for explaining disengagement of a cam follower pin from a cam slot.

FIG. 9 is a schematic diagram for explaining a case, as an example of the action of an external force, where a user of a camera C unintentionally dropped the camera C. If the weight of the whole camera C acts on a tip end of the first group unit 1, as shown in FIG. 10 the cam follower pin 22 of the first group unit 1 will shave the perpendicular surface and the slant surface of the cam slot 16a of the cam tube 16 such that it will disengage from the cam slot. Furthermore, the first group unit 1 will incline, so the zoom operation will be unable to do afterwards.

In this case, since the section of the cam follower pin 22 has a circular shape, the contact area to the cam slot 16a is small such that the cam follower pin 22 which is a metal member can shave the cam slot 16a which is a molded element. Furthermore, the proof strength to the external force is better in the structure in which the cam slot 16a is provided with a perpendicular surface than the structure in which the cam slot is provided with inclined surfaces of a trapezoid shape. However, the higher the falling height is, the larger the applied impact force is. Thus, further improvement of the proof strength to the shaving is required.

Figure 11:
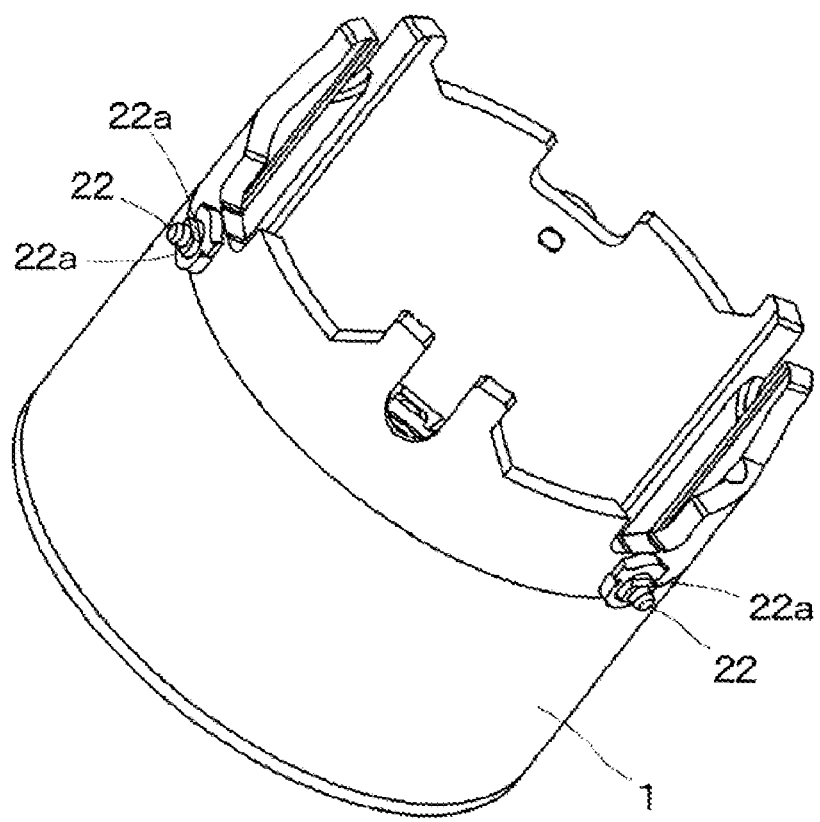
FIG. 11 is a perspective view of a first group unit.

In the present embodiment, taking the contact area to the cam slot 16a of the cam follower pin 22 into consideration, D-shaped cutting is carried out at both sides of the cam follower pin 22 as shown in FIG. 11, so as to form parallel surfaces 22a thereby to increase the proof strength to the shaving.

The parallel surfaces 22a of the cam follower pin 22 shown in FIG. 11 should be made parallel to the flat section of the cam slot 16a near the telephoto position and the flat section near the wide-angle position, being perpendicular to the optical axis, as shown in FIG. 6. In consideration of this, in the present embodiment, the cam follower pin is so press fitted that the parallel surfaces 22a are oriented in a direction orthogonal to the optical axis direction of the lens holding frame of the first group unit 1, as shown in FIG. 11.

Figure 12:
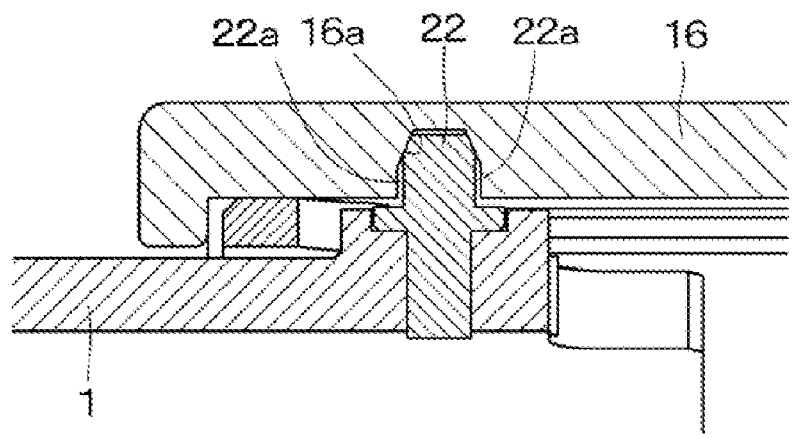
FIG. 12 is an enlarged sectional view illustrating the engagement between the cam slot and the cam follower pin.

FIG. 12 is an enlarged sectional view illustrating the engagement between the cam follower pin 22 and the cam slot 16a at the telephoto position of FIG. 4. The cam follower pin 22 is configured to be in engagement only with the slant surfaces of the cam slot 16a. With regard to the parallel surface 22a and the perpendicular surface of the cam slot 16a, since double engagement is difficult to achieve due to the component precision, a clearance is maintained therebetween. Furthermore, the relationship of the parallel surface 22a and the cam slot 16a mentioned above similarly applies to the portion, around the wide-angle position, of the flat section extending in a direction perpendicular to the optical axis, as shown in FIG. 6.

Figure 13:
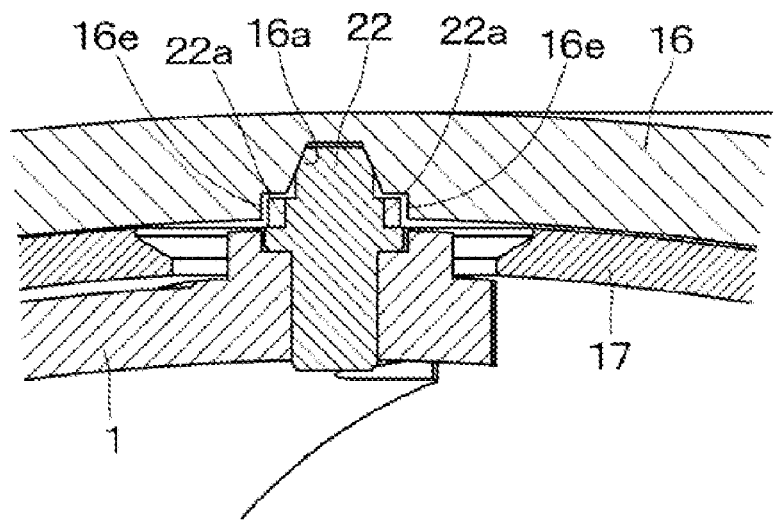
FIG. 13 is an enlarged sectional view illustrating the engagement of a cam slot having a step with a cam follower pin.

On the other hand, in the cam locus portion which includes a lift portion extending in a direction not orthogonal to the optical axis, such as a zone between the telephoto position and the wide-angle position or the zone between the tube collapsed position and the wide-angle position shown in FIG. 6, the parallel surface 22a of the cam follower pin 22 may interfere with the cam slot 16a. In consideration of this, a stepped portion is formed in the cam slot 16a to avoid such interference. Thus, FIG. 13 is a sectional view between the telephoto position and the wide-angle position shown in FIG. 6. The cam slot 16a of the cam locus portion having a lift portion is not provided with a perpendicular surface but it is formed only with slant surfaces. Furthermore, a stepped portion 16e is formed. With this arrangement, the interference with the parallel surfaces 22a of the cam follower pin 22 is avoided.

Figure 14:
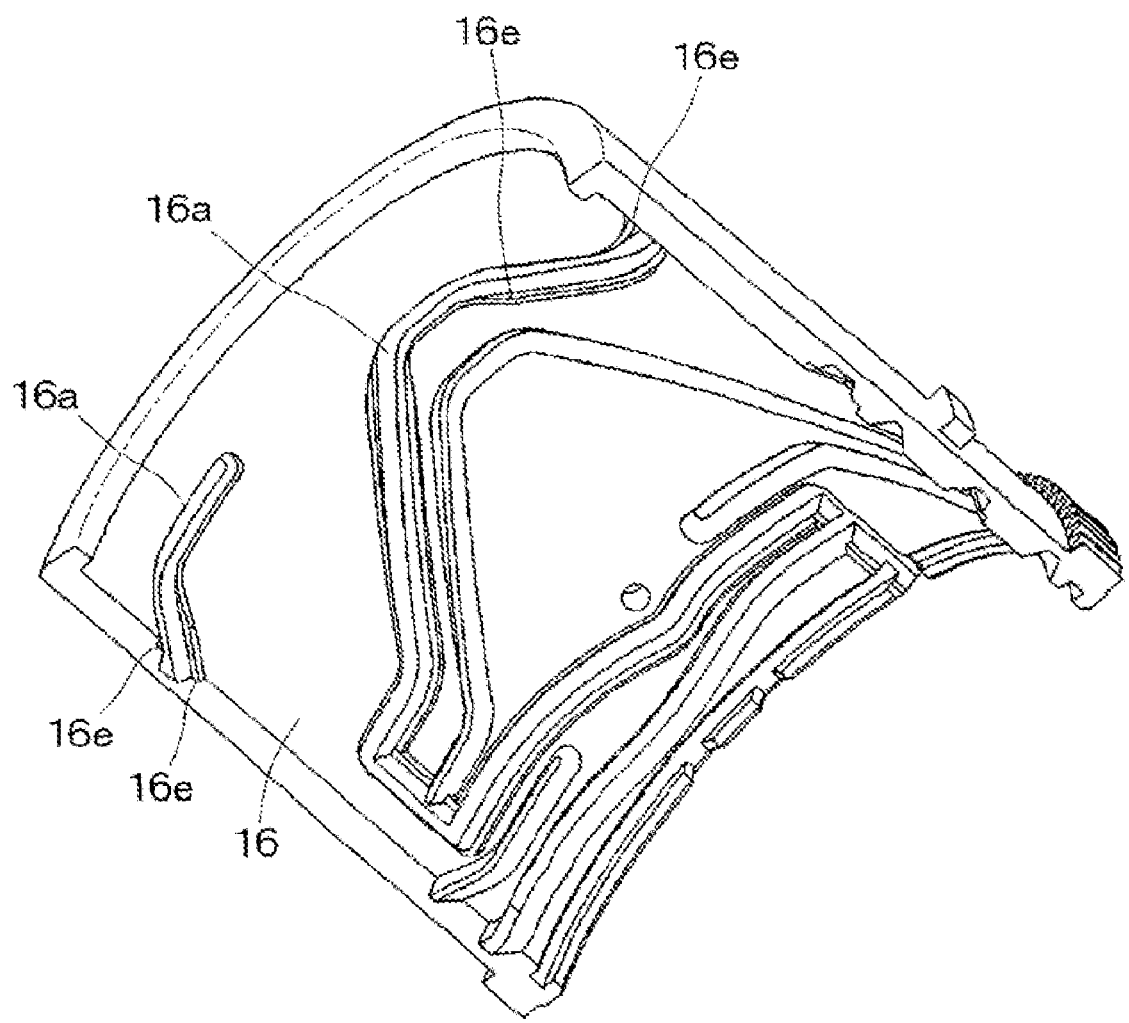
FIG. 14 is a perspective view of a cam tube.

FIG. 14 is a perspective view as seen from the inside of the cam tube 16. The connection of the perpendicular surface/slant surface of the cam slot 16a and the stepped portion 16e is just as shown in the development diagram of FIG. 6.

Figure 15:
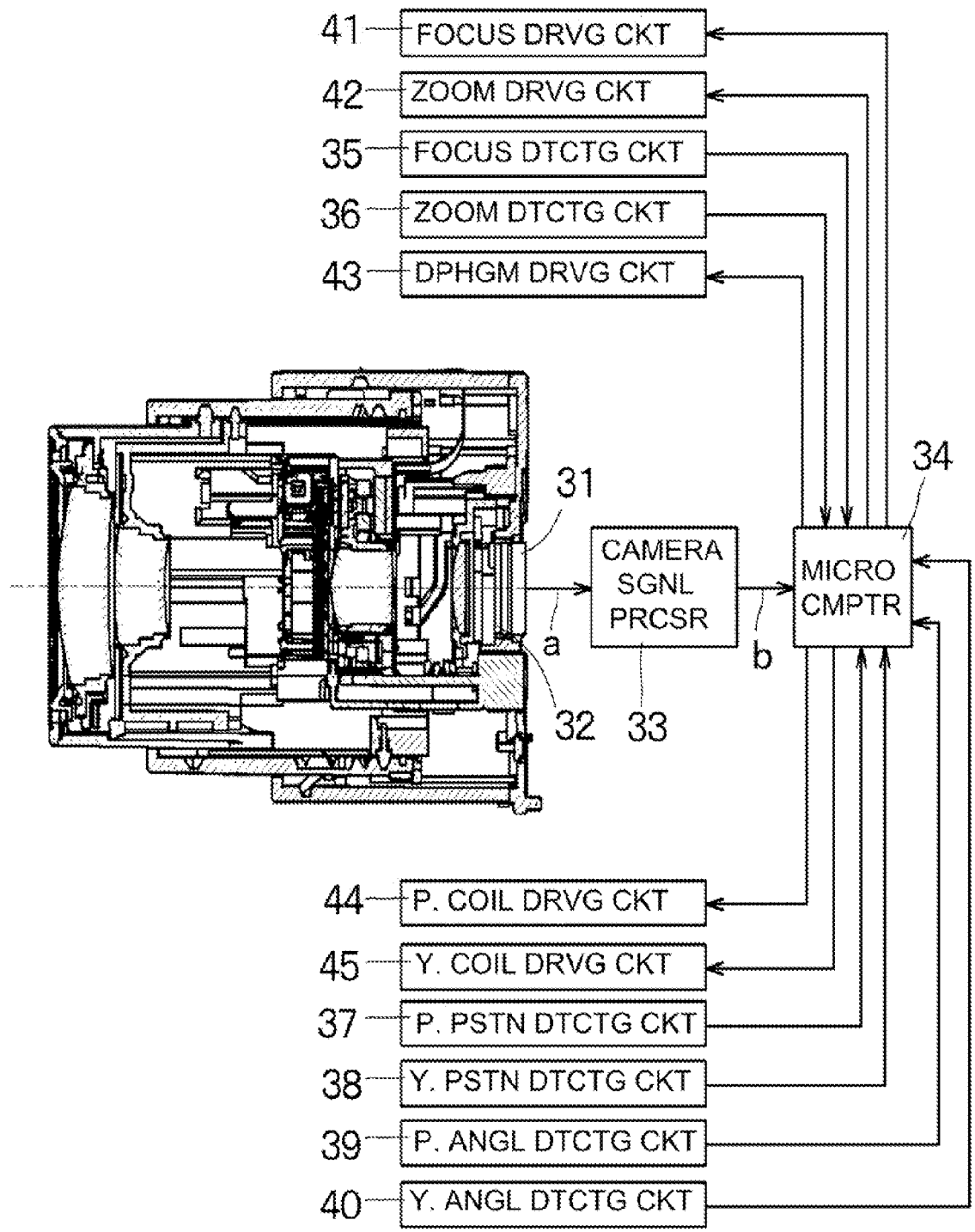
FIG. 15 is a block circuit diagram for a lens driving function and a blurring correction function.

FIG. 15 is a block diagram of a driving and blurring correcting circuit for a lens barrel of a photographic apparatus, having a blurring correction function. An electrical signal of an optical image inputted to an image pickup device 32 through an optical low-pass filter 31 is applied through a camera signal processing unit 33 to a microcomputer 34. Connected to this microcomputer 34 are outputs of a focus detecting circuit 35, zoom detecting circuit 36, pitch position detecting circuit 37, yaw position detecting circuit 38, pitch angle detecting circuit 39 and yaw angle detecting circuit 40.

Furthermore, the output of the microcomputer 34 is connected to a focus driving circuit 41, zoom driving circuit 42, stop driving circuit 43, pitch coil driving circuit 44 and yaw coil driving circuit 45.

Inside the lens barrel, the optical low-pass filter 31 removes a higher range component of the spatial frequency of the photogenic subject. The image pickup device 32 is an image pickup element disposed on the focal surface to convert an optical image into an electrical signal. The electrical signal a read out from the image pickup device 32 is transformed into an imagewise signal b by means of a camera signal processing unit 33.

The microcomputer 34 controls the lens driving. When the power is turned on, the microcomputer 34 monitors the outputs of the focus detecting circuit 35 and zoom detecting circuit 36. Then, by the focus driving circuit 41 and zoom driving circuit 42, their motors are rotated to move corresponding lens groups in the optical axis direction.

The outputs of the focus detecting circuit 35 and zoom detecting circuit 36, when their movable members come to a predetermined position having been preset, are inverted as the light blocking wall provided on the movable member reaches the boundary for shading a light emitting member of the photointerrupter.

Taking this position as a reference, the focusing afterwards is carried out by counting the number of driving steps of the focusing motor 11 with the microcomputer 34. Furthermore, the zoom driving is carried out by counting, with the microcomputer 34, the pulse outputs produced by the pulse board and the photointerrupter having been built in a zoom motor unit 20. Based on this, the microcomputer 34 is able to detect the absolute position of each lens group. As a result, exact focal length data is obtained. A series of operations mentioned above are called a zoom and focus resetting operation.

The stop driving circuit 43 drives a stop device 13 and, based on brightness data b of a pictorial signal taken into the microcomputer 34, the light quantity adjusting function through the stop unit 5 such as the aperture diameter of the stop or the restriction amount by an ND filter, for example, are controlled. Although this embodiment is an example in which a CCD is used as an image pickup device, a CMOS may of course be used in place of it.

The angle detecting circuits 39 and 40 serve to detect the pitch (tilt angle in the longitudinal direction) of the optical device and the yaw (tilt angle in the lateral direction), respectively. The detection of the angle may be carried out by, for example, integrating outputs of an angular velocity sensor such as an oscillation gyro or the like fixed to the photographic apparatus, for example. The outputs of the pitch angle detecting circuit 39 and the yaw angle detecting circuit 40, that is, the information concerning the tilt angle of the photographic apparatus, are supplied into the microcomputer 34.

The pitch coil driving circuit 44 and yaw coil driving circuit 45 are provided to move the third lens group L3 perpendicularly to the optical axis so as to perform blurring correction. These operate to energize coils of a shift magnetic circuit to produce a driving force for shifting the third group unit 3.

By means of the pitch position detecting circuit 37 and yaw position detecting circuit 38, the amount of shift of the third group unit 3 with respect to the optical axis is detected, and the result is applied to the microcomputer 34. When the third group unit 3 moves perpendicularly relative to the optical axis in response to the output of the microcomputer 34, the passing light beam is bent so that the position of the photogenic subject image being focused on the image pickup device 32 displaces.

The amount of displacement of the image at this time is controlled by the microcomputer 34 so that the image displaces in a direction opposite to the direction of image displacement caused when the photographic apparatus actually tilts, and by the same amount. By doing so, the blurring correction is accomplished: the focused image does not displace even if the photographic apparatus moves.

Inside the microcomputer 34, the tilt signal of the photographic apparatus obtained from the pitch angle detecting circuit 39 and the yaw angle detecting circuit 40 and the shift amount signal of the third group unit 3 obtained from the pitch position detecting circuit 37 and the yaw position detecting circuit 38 are deducted, respectively. Then, amplification and appropriate phase compensation are carried out to the respective difference signals, and subsequently resultant signals are used to drive the third lens group L3 through the pitch coil driving circuit 44 and the yaw coil driving circuit 45.

By this control, the positioning control is so carried out to make smaller the difference signal mentioned above, and the controlled object is kept at the target position. Furthermore, in this embodiment, since the magnification changing operation is performed based on the relative displacement of the first, second and third group units 1, 2 and 3, the amount of displacement of the image relative to the shift amount of the third group unit 3 changes with the focal length.

In consideration of this, the amount of shift of the third group unit 3 is not determined just by the tilt signal of the photographic apparatus as obtained from the pitch angle detecting circuit 39 and the yaw angle detecting circuit 40. But rather, correction based on the focal length information is carried out so as to cancel the displacement of the image due to the tilt of the photographic apparatus by moving the third group unit 3.

The present invention is not limited to the structure of the embodiment described above. Various changes and modifications may be made within the scope of the invention.

For example, although in the embodiment described above the cam slot 16a and the cam follower 22 for driving the first group unit 1 which may be mostly influenced by the impact by fall or the like are provided with a perpendicular surface being orthogonal to the optical axis, another cam slot and cam follower for driving a separate unit may be provided with a perpendicular surface orthogonal to the optical axis. This is because even in a separate unit there would be indirect influence of the impact.

Furthermore, the present invention does not always need to be applied to a cam slot and a cam follower for driving a lens. Rather, a cam slot 15a and cam follower 21 for driving the cam tube 16 in the optical axis direction, shown in the aforementioned embodiment, may have a similar structure. Namely, the present invention may have such structure that: there are a tube having a cam slot and a tube which is fitted within former and which has a cam follower engaging with the cam slot; these are relatively rotated about the optical axis so that they relatively move in the optical axis direction; and the cam slot 15a and the cam follower 21 have a surface perpendicular to the optical axis.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-169246 filed Jun. 27, 2008, for which is hereby incorporated by reference.

What is claimed is:

1. A lens barrel, comprising:
a lens holding frame configured to hold a lens and being provided with a cam follower;
a guide tube engaging with said lens holding frame and being configured to rectilinearly guide said lens holding frame in an optical axis direction; and
a cam tube engaging with said guide tube and being provided with a cam slot which engages with said cam follower, said cam tube being configured to rotate about the optical axis thereby to move said lens holding frame in the optical axis direction,
wherein as seen in an extending direction in which said cam slot extends, said cam slot has a locus including a flat portion orthogonal to the optical axis and a lift portion not orthogonal to the optical axis,
wherein as seen in an extending direction in which said cam slot extends, the flat portion has a perpendicular surface perpendicular to the optical axis,
wherein as seen in an extending direction in which said slot extends, said cam follower is provided with a parallel surface parallel with the perpendicular surface at a position opposing the perpendicular surface, and
wherein as seen in an extending direction in which said cam slot extends, a spacing distance between the parallel surface of said cam follower and a surface of said lift portion provided at the position opposing the parallel surface of said cam follower is larger than a spacing distance between the parallel surface of said cam follower and the perpendicular surface of said flat portion.

2. A lens barrel as claimed in claim 1, wherein said lens holding rame holds a lens which is closest to a photogenic subject side.

3. A lens barrel as claimed in claim 1, wherein the lens is a zoom lens.

4. A lens barrel as claimed in claim 1, wherein said cam slot of the lift portion is formed with a step configured to avoid interfere with the parallel surface.

5. A lens barrel as claimed in claim 1, wherein said cam slot is formed at an inner wall of said cam tube, and wherein said lens holding frame is fitted into said cam tube.

6. A camera having a lens barrel as claimed in claim 1.

7. A lens barrel according to claim 1, wherein said flat portion is provided at each of a collapsed position, a wide angle position and a telephoto position.

8. A lens barrel according to claim 1, wherein said cam follower has a trapezoidal configuration at a free end thereof, and said lift portion and said flat portion have trapezoidal configurations at bottoms thereof, and wherein the free end portion of said cam follower and the bottom portion of said lift portion are engaged with each other, and the free end portion of said cam follower and the bottom portion of said flat portion are engaged with each other.

9. A lens barrel, comprising:
a first tube provided with a cam slot; and
a second tube engaging with said first tube and being provided with a cam follower which engages with said cam slot, said first tube being configured to relatively rotate relative to said second tube about an optical axis, whereby said first tube is relatively moved relative to said second tube in the optical axis direction,
wherein as seen in an extending direction in which said cam slot extends, said cam slot has a locus including a flat portion orthogonal to the optical axis and a lift portion not orthogonal to the optical axis,
wherein as seen in an extending direction in which said cam slot extends, the flat portion has a perpendicular surface perpendicular to the optical axis,
wherein as seen in direction in which said cam slot extends, said cam follower is provided with a parallel surface parallel with the perpendicular surface at a position opposing the perpendicular surface, and
wherein as seen in an extending direction in which said cam slot extends, a spacing distance between the parallel surface of said cam follower and a surface of said lift portion provided at the position opposing the parallel surface of said cam follower is larger than a spacing distance between the parallel surface of said cam follower and the perpendicular surface of said flat portion.

10. A lens barrel according to claim 9, wherein said flat portion is provided at each of a collapsed position, a wide angle position and a telephoto position.

11. A lens barrel according to claim 9, wherein said cam follower has a trapezoidal configuration at a free end thereof, and said lift portion and said flat portion have trapezoidal configurations at bottoms thereof, and wherein the free end portion of said cam follower and the bottom portion of said lift portion are engaged with each other, and the free end portion of said cam follower and the bottom portion of said flat portion are engaged with each other.

* * * * *